United States Patent [19]

Flanhardt et al.

[11] Patent Number: 5,065,639
[45] Date of Patent: Nov. 19, 1991

[54] DOUBLE BEVEL GEAR ANGULAR DRIVE

[75] Inventors: Michael Flanhardt; Andreas Roth, both of Köln; Clemens Nienhaus, Lohmar, all of Fed. Rep. of Germany

[73] Assignee: Jean Walterscheid GmbH, Lohmar, Fed. Rep. of Germany

[21] Appl. No.: 615,222

[22] Filed: Nov. 19, 1990

[30] Foreign Application Priority Data

Nov. 24, 1989 [DE] Fed. Rep. of Germany ....... 3938967

[51] Int. Cl.⁵ .......................... F16H 1/14; B25B 17/00
[52] U.S. Cl. ........................................ 74/417; 74/423; 81/57.13; 81/57.29
[58] Field of Search .............................. 81/57.13, 57.29; 74/417, 423, 15.2

[56] References Cited

U.S. PATENT DOCUMENTS

| 609,344 | 8/1898 | Harrity | 74/417 |
| 4,525,987 | 7/1985 | Werner et al. | 56/15.2 |
| 4,696,199 | 9/1987 | Fabbi | 74/417 |
| 4,953,411 | 9/1990 | Coenen et al. | 74/417 X |

FOREIGN PATENT DOCUMENTS

| 7911366 | 7/1982 | Fed. Rep. of Germany |  |
| 53-40148 | 4/1978 | Japan | 74/417 |

Primary Examiner—Leslie A. Braun
Assistant Examiner—David W. Laub
Attorney, Agent, or Firm—Toren, McGeady & Associates

[57] ABSTRACT

An assembly consisting of two bevel gear angular drives which are pivotably connected to each other via a pivot bearing, the bearing system including two bevel roller bearings which are tensioned relative to each other between the two sleeves. The shaft carrying the two bevel gears is also supported via bevel roller bearings in the sleeves. In this way it is possible to obtain an assembly which is suitable for implements which transmit high tensile forces to the assembly, without the bearing system and the rotary function of the two drives being adversely affected.

6 Claims, 2 Drawing Sheets

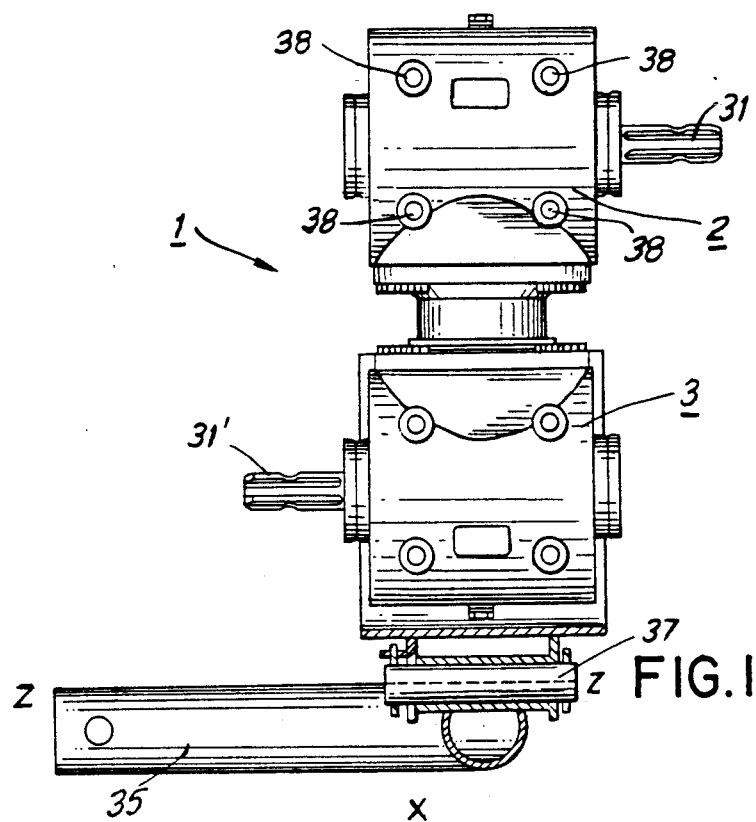
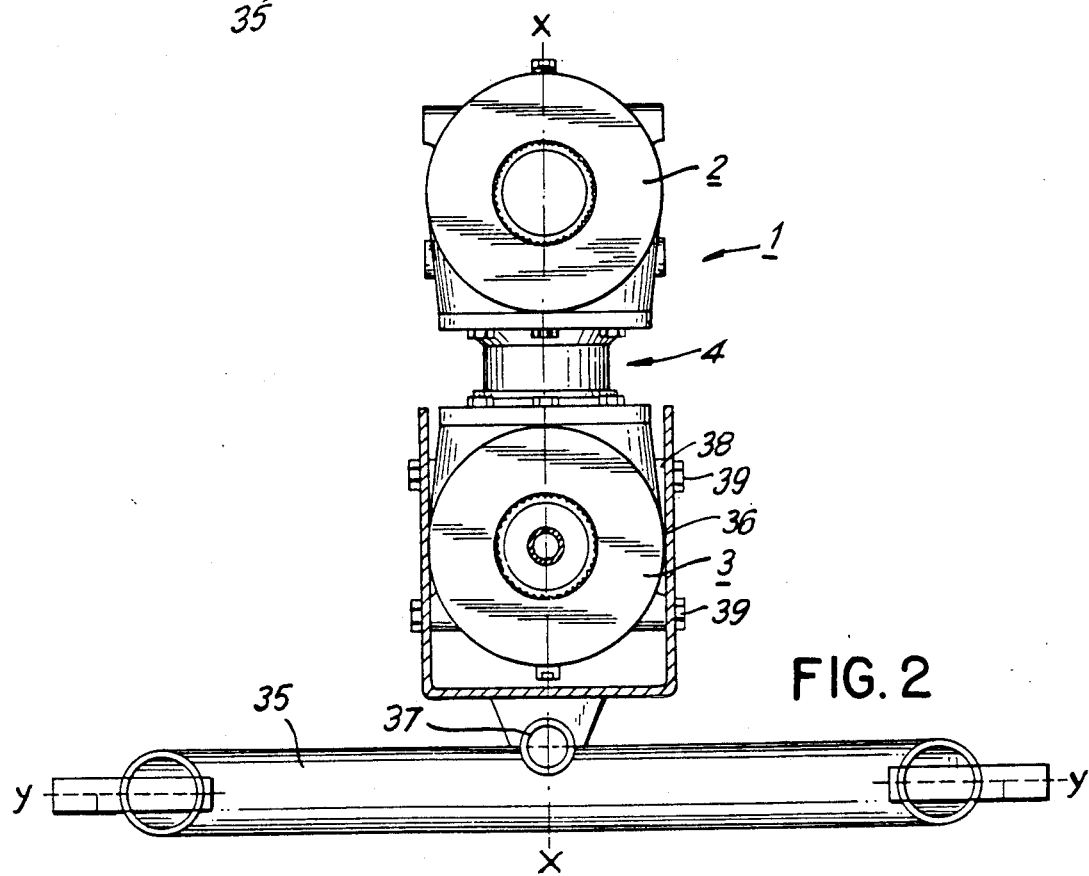

DOUBLE BEVEL GEAR ANGULAR DRIVE

BACKGROUND OF THE INVENTION

The invention relates to an assembly consisting of two bevel gear angular drives pivotably connected to two spaced roller bearing via a pivot bearing, especially for drives used in land machinery. With a bevel gear of each of the two bevel gear angular drives is secured on a joint shaft extending centrally through the pivot bearing and the pivot bearing consists of two coaxial sleeves and has formed-on flanges secured to the housings of the bevel gear angular drives, the roller bearings being arranged between the sleeves.

Such an assembly is known from EP 0 124 462 B1, for example, in the case of which the two bevel gear angular drives are supported relative to each other by two sleeves provided with a friction bearing. For axial securing purposes it is necessary to take additional measures for securing the two parts relative to each other. In order to keep the bearing assembly free from tensile forces, there is provided a bracket which surrounds and pivotably supports the bearing sleeve. Furthermore, the shaft carrying a bevel gear of each of the two bevel gear angular drives, one the one hand, is supported directly in the associated drive housing and, on the other hand, is supported in the sleeves via the associated bevel gear.

Because of the forces exerted by attaching the implement, such a bearing is subjected to additional loads so that jamming may occur. Furthermore, a further bearing region is required because of the additional bracket.

SUMMARY OF THE INVENTION

It is an object of the present invention to provide an assembly consisting of two bevel gear angular drives which are held pivotably relative to each other, in which any forces resulting from attaching the implement do not affect the bearing system of the bevel gears and in which the forces are accommodated directly via the housing and the pivot bearing and where, additionally, articulation of the tractor and implement fixing means is improved.

Pursuant to this object, and others which will become apparent hereafter, one aspect of the present invention resides in the two roller bearings being designed as bevel roller bearings, with the bearings being tensioned relative to each other at the sleeves. The shaft provided with the two bevel gears is also supported in the two sleeves via bevel roller bearings.

The advantage of this design is that all forces are deflected directly via the housing and the pivot bearing. The pivot roller bearings ensure that any tensile forces resulting from attaching implements are effectively accommodated. By providing direct support for the shaft carrying the bevel gears, with one being associated with each bevel gear angular drive, again in the two sleeves, any jamming affecting the running behavior of two engaging bevel gears of the two bevel gear angular drives is prevented.

There is a further advantage in that the assembly, because of its design, is particularly advantageous for being used in connection with attaching agricultural implements to tractors, with all forces resulting from attaching an implement being accommodated by the drive. The bearing system ensures that the function of the two bevel gear angular drives connected to each other so as to be articulated is not adversely affected by tensile forces.

According to a further embodiment it is proposed that, in each case, the further bevel gear of the two bevel gear angular drives is supported in the housing via bevel roller bearings, with the bearings being arranged on either side of the bevel gear. In this way, it is possible to achieve a wide supporting base for the movements resulting from the transmission of torque by the bevel gears.

According to a particularly advantageous embodiment, the two sleeves and/or the bevel roller bearings associated with the shaft are arranged in such a way that the end faces with the small roller diameters of the bevel rollers face each other. In this way, the two sleeves and the shaft are supported in the pivot bearing in an optimum way.

In a further embodiment, the bevel roller bearings associated with the sleeves may be tensioned via stops at the outer sleeve and the inner sleeve as well as via a tensioning nut which may be screwed on to the inner sleeve. In consequence, the pivot bearing together with the shaft carrying the bevel gears may be preassembled to form one unit. Furthermore, by tightening the tensioning nut accordingly, it is possible to obtain clearance-free conditions which are required for supporting purposes.

Finally, it is proposed that of the bearings carrying the shaft, one should be received in the outer sleeve and the other one in the inner sleeve.

The novel feature which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a diagrammatic view of the invention provided with a bearing arm for being connected to the three-point attaching device of the tractor;

FIG. 2 is a side view of FIG. 1; and

DETAILED DESCRIPTION OF THE PREFERRED EMBODIMENTS

Figure 3:
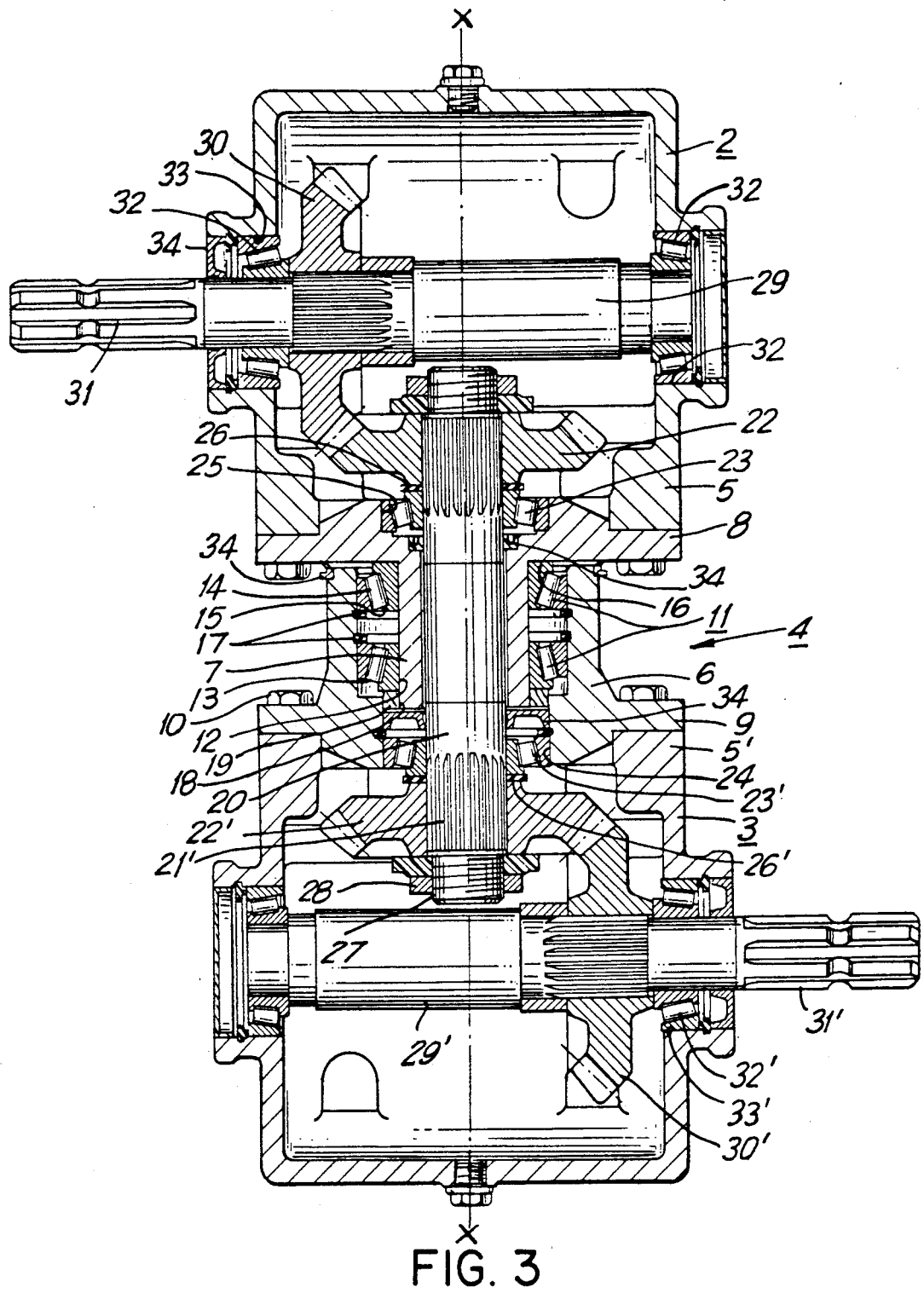
FIG. 3 is a section through the assembly.

FIGS. 1 and 2 give a general view of the double drive 1 forming the assembly. The double drive 1 comprises an upper bevel gear angular drive 2 and a lower bevel gear angular drive 3 which, via a pivot bearing 4, are connected to each other so as to be pivotable around the axis X—X. A bearing bracket 36 is secured to the housing of the lower bevel gear angular drive 3 via connecting cams 38 and bolts 39.

A bearing arm 35 is connected to the bearing bracket 36 via a bearing 37. The bearing arm 35 permits fixing to the lower steering arms of the tractor. Articulation at the lower steering arm of the tractor allows the entire assembly to be pivoted around the X—X. The bearing 37 permits the assembly 1 to be pivoted around an axis extending transversely relative to the axis Y—Y, i.e., axis Z—Z. The double drive 1 itself permits pivoting of the upper bevel gear angular drive 2 around the axis X—X. This means that there exists freedom of movement around three axes. The upper bevel gear angular drive 2, via the connecting cams 38 and threaded pins secured in its threaded bore, may be secured to the frame of an implement to be driven by the tractor.

The cams 38 and the bolts 39 are also used to fix the bearing bracket 36 to the lower bevel gear angular drive 3. This type of articulation permits large articulation angles between the tractor and the implement to be attached and driven by the tractor. For driving purposes, there is provided a profiled journal 31 which is connected to the driveshaft driven by the power take-off shaft of the tractor. The implement is driven via the profiled shaft 31.

The design of the assembly of the double drive 1 is shown in FIG. 3. The two bevel gear angular drives 2, 3 each comprise a housing 5, 5' which housings are connected to each other via the pivot bearing 4. For this purpose, the pivot bearing 4 is provided with an outer sleeve 6 comprising a formed-on flange 9 which, via bolts 10, is firmly connected to the housing 5' of the bevel gear angular drive 3.

The inner sleeve 7 is arranged concentrically relative thereto; it is also provided with a flange 8 which, via bolts 10, is firmly connected to the housing 5 of the bevel gear angular drive 2. The two sleeves 6, 7 are supported relative to each other via bevel roller bearings 11 spaced along the axis X—X. An outer bearing ring 13 of the two bevel roller bearings 11 is axially supported on a stop ring 17 of the outer sleeve 6, whereas the inner bearing ring 12 of a bevel roller bearing 11 rests against a shoulder serving as stop 16 at the outer sleeve 6. The inner bearing ring 12 of the other bevel roller bearing 11 is supported on a tensioning nut 19 which may be threaded on to a thread 18 of the inner sleeve 7. As a result, the two sleeves 6, 7 forming the pivot bearing may be firmly tensioned relative to each other. The relatively long design of the sleeves 6, 7 ensures a considerable degree of stiffness against bending, i.e., against tensile forces exerted on the two bevel gear angular drives 2, 3 in the drawing plane in opposite directions.

The inner sleeve 7 is also hollow, with a shaft 20 extending through it and with the bevel gears 22 associated with the two bevel gear angular drive 2, 3 being attached to the shaft 20. Two bevel roller bearings 23, 23' provided for the bearing system are received in bearing bores 24 of the outer sleeves 6 and 25 of the inner sleeve 7, and are axially secured by securing rings 26' in their positions on the shaft 20 and at the respective contact faces of the two sleeves 6, 7 in the region of the bearing bores 24, 25. The two ends of the shaft 20 are provided with teeth 21, 21' on which bevel gears 22, 22' are non-rotatingly accommodated. The bevel gears are secured relative to the shaft by nuts 28 threaded on to their threaded ends 27.

The bevel roller bearings 11 of the two sleeves 6, 7 and 23 for supporting the shaft are arranged so that the end faces of the small diameters of the bevel rollers 14 face each other, thereby achieving the most advantageous supporting phase. The other bearing shaft 29, 29' on which the second bevel gear 30, 30' of the two bevel gear angular drives 2, 3 is arranged, is accommodated in the housing 5, 5' in such a way that one bevel roller bearing 32, 32' each is accommodated in bearing bores 33, 33' on either side of the bevel gear 30, 30'. Again, this design ensures a large supporting base for receiving the bending moments resulting from the tooth forces.

The profiled journals 31, 31' formed on to the bearing shafts 29, 29' project from the housing 5, 5' and serve to transmit the drive and permit connection to the implement to be driven. Seals 34 are provided to seal the pivot bearing 4 and its bearings 11 as well as the bearings 23 of the shaft 20 and the bearing shaft 29, 29'.

While the invention has been illustrated and described as embodiment in a double bevel gear angular drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An assembly, comprising:
    two bevel gear angular drives each having a housing;
    two spaced bevel roller bearings;
    a pivot bearing pivotably connecting the two bevel gear angular drives to the two spaced roller bearings;
    a joint shaft extending centrally through the pivot bearing, each of the two bevel gear angular drives having a bevel gear secured on the joint shaft, the pivot bearing including two coaxial sleeves having formed-on flanges secured to the housings of the bevel gear angular drives, the two bevel roller bearings (11) being arranged between the sleeves, and being tensioned relative to each other at the coaxial sleeves (6, 7); and
    additional bevel roller bearings (23, 23') arranged so as to support the joint shaft (20) provided with the two bevel gears (22, 22') in the two sleeves (6, 7).

2. An assembly according to claim 1, wherein in each case, a further bevel gear (30, 30') of the two bevel gear angular drives (2, 3) is supported in the housing (5, 5') via third bevel roller bearings (32, 32'), with the third bearings (32, 32') being arranged on either side of the further bevel gear (30, 30').

3. An assembly according to claim 1, wherein the two bevel roller bearings (11) and the additional bevel roller bearing (23) have bevel rollers (14) with end faces (15) of a small roller diameter, at least one of the two and the additional bevel roller bearings (11, 23) associated with the shaft (20) and the two sleeves (6, 7) is arranged so that the end faces (15) of the bevel rollers (14), which have small roller diameter, face each other.

4. An assembly according to claim 1, wherein the sleeves (6, 7) include an outer sleeve (6) and an inner sleeve (7), the bevel roller bearings (11) associated with the sleeves (6, 7) being tensionable via stops (16, 17) at the outer sleeve (6) and the inner sleeve (7) as well as via a tensioning nut (19) which is screwable onto the inner sleeve (6).

5. An assembly according to claim 1, wherein one of the bearings (23') carrying the shaft (20) is received in an outer one of the sleeves (6) and another one of the bearings (23) is received in an inner one of the sleeves (7).

6. An assembly according to claim 3, wherein one of the bearings (23') carrying the shaft (20) is received in an outer one of the sleeves (6) and another one of the bearings (23) is received in an inner one of the sleeves (7).

* * * * *